United States Patent
Klein et al.

(10) Patent No.: US 10,718,318 B2
(45) Date of Patent: Jul. 21, 2020

(54) PROPELLANT GAS SUPPLY FOR AN IONIC PROPULSION UNIT

(71) Applicant: SAFRAN AIRCRAFT ENGINES, Paris (FR)

(72) Inventors: Manuel Klein, Vernon (FR); Serge Le Gonidec, Vernon (FR)

(73) Assignee: SAFRAN AIRCRAFT ENGINES, Paris (FR)

( * ) Notice: Subject to any disclaimer, the term of this patent is extended or adjusted under 35 U.S.C. 154(b) by 431 days.

(21) Appl. No.: 14/439,958

(22) PCT Filed: Oct. 21, 2013

(86) PCT No.: PCT/FR2013/052504
§ 371 (c)(1),
(2) Date: Apr. 30, 2015

(87) PCT Pub. No.: WO2014/068217
PCT Pub. Date: May 8, 2014

(65) Prior Publication Data
US 2015/0300329 A1    Oct. 22, 2015

(30) Foreign Application Priority Data
Oct. 30, 2012 (FR) .................................. 12 60322

(51) Int. Cl.
*F03H 1/00* (2006.01)
*B64G 1/40* (2006.01)
*G05D 16/20* (2006.01)

(52) U.S. Cl.
CPC ........... *F03H 1/0012* (2013.01); *B64G 1/402* (2013.01); *G05D 16/2013* (2013.01)

(58) Field of Classification Search
CPC .............................. F03H 1/0012; B64G 1/405
See application file for complete search history.

(56) References Cited

U.S. PATENT DOCUMENTS

| 5,954,089 A | 9/1999 | Seymour |
| 2004/0061028 A1* | 4/2004 | Salvatore ............... B64G 1/402 244/171.1 |
| 2010/0043759 A1 | 2/2010 | Kylström et al. |

FOREIGN PATENT DOCUMENTS

| CN | 1184890 A | 6/1998 |
| FR | 2 973 081 A1 | 9/2012 |

(Continued)

OTHER PUBLICATIONS

The Lee Co. "Product Data Sheet" 2006.*

(Continued)

*Primary Examiner* — Gerald L Sung
*Assistant Examiner* — William Breazeal
(74) *Attorney, Agent, or Firm* — Oblon, McClelland, Maier & Neustadt, L.L.P.

(57) ABSTRACT

A field of feeding propellant gas to ion thrusters, and in particular a method of feeding an ion thruster with propellant gas coming from a pressurized tank via a feed circuit including an on/off valve and, in succession downstream from the on/off valve, a high pressure restrictor, a buffer tank, and at least one low pressure restrictor. The method includes the steps of calculating a pressure setpoint for the buffer tank as a function of a flow rate setpoint, calculating the difference between the pressure setpoint for the buffer tank and a pressure measured in the buffer tank, calculating a setpoint for the opening time of the on/off valve as a function of the difference and of a pressure inside the pressurized tank, and opening the on/off valve in compliance with the opening time setpoint.

9 Claims, 2 Drawing Sheets

(56) References Cited

FOREIGN PATENT DOCUMENTS

| FR | 2973081 | * | 9/2017 | ............... F03H 1/00 |
|---|---|---|---|---|
| KR | 10-2012-0062288 A | | 6/2012 | |
| RU | 2 149 440 C1 | | 5/2000 | |
| WO | WO 2012/020190 A1 | | 2/2012 | |

OTHER PUBLICATIONS

Funaki "Development of Microwave Discharge Ion Engine System for Asteroid Sample and Return Mission MUSES-C" (Year: 1997).*
Snyder "Simplified Ion Thruster Xenon Feed System for NASA Science Missions" (Year: 2009).*
Combined Office Action and Search Report dated Apr. 1, 2017 in Chinese Patent Application No. 201380057058.3 (with English translation of Office Action and English translation of category of cited documents).
International Search Report dated May 20, 2014, in PCT/FR2013/052504, filed Oct. 21, 2013.
"Gas pipe discharge flow rate calculator", http://www.pipeflowcalculations.com/gasleak/, XP055073873, Oct. 19, 2012, 2 pages.
"Lohm Laws for Gas—how to calculate flow resistance for gases", http://www.theleeco.com/engineerinq/gases/calculate-flow-resistance-gases.cfm, XP 055074126, Aug. 5, 2013, 1 page.
Notice of Rejection dated Jun. 27, 2017 in Japanese Patent Application No. 2015-538528 (English translation only).
Ukrainian Office Action issued in Ukraine Patent Application No. a201504130 dated Mar. 26, 2018, citing documents AA and AX-AY therein.
The Lee Company, "How to Calculate Flow Resistance for Gases," http://www.theleeco.com/engineering/gases/calculate-flow-resistance-gases.cfm.
"Gas Pipe Discharge Flow Rate Calculator," http://web.archive.org/web/20121019165530/http://www.pipeflowcalculations.com/gasleak/.
Thompson et al., "The Xenon Regulator and Feed System for Electric Propulsion Systems," The $29^{th}$ International Electric Propulsion Conference, Princeton University, Oct. 31-Nov. 4, 2005.
Ganapathi et al., "Performance of the Xenon Feed System on Deep Space One," Journal of Spacecraft and Rockets, vol. 37, No. 3, May-Jun. 2000.
European Office Action issued in European Patent Application No. 13 789 865.6 dated Apr. 26, 2018.

* cited by examiner

PROPELLANT GAS SUPPLY FOR AN IONIC PROPULSION UNIT

BACKGROUND OF THE INVENTION

The present invention relates to the field of feeding ion thrusters, and more particularly to a method and a device for feeding propellant gas to an ion thruster.

The term ion thruster is used to mean any reaction thruster, in particular for space applications, that is based on accelerating charged particles by means of an electrostatic field. This thus includes thrusters in which the particles are charged electrically by contact as well as so-called plasma thrusters, in which a plasma is generated that contains the charged particles. The invention is particularly but not exclusively applicable to feeding plasma thrusters and in particular so-called "Hall effect" thrusters having an annular channel, an anode, a magnetic circuit suitable for creating a magnetic circuit suitable for generating a magnetic field at a downstream end of the annular channel, and a cathode situated outside the downstream end of the annular channel, and in which a propellant gas, such as xenon, for example, is injected into the annular channel.

Typically, when such a Hall effect thruster is in operation, a propellant gas is injected in the proximity of the anode into the end of the annular channel. Electrons emitted by the cathode and attracted towards the anode at the end of the annular channel are trapped by the magnetic field in spiral trajectories between the two walls, thus forming a virtual cathode grid. Electrons escaping from this magnetic enclosure towards the anode come into collision with atoms of propellant gas injected into the end of the annular channel, thereby creating an ionized plasma.

The positive ions of the plasma are accelerated by the electric field that exists between the anode and the virtual cathode grid formed by the cloud of electrons trapped by the magnetic field at the open end of the annular channel. Since the mass of these positive ions is much greater than the mass of an electron, their trajectories are hardly affected by the magnetic field. The ions of this plasma jet are finally neutralized downstream from the magnetic field by electrons emitted by the cathode or produced by ionizing the plasma.

Ion thrusters have begun to be used in attitude and orbit control systems (AOCSs) for space vehicles, and in position in the AOCSs of geostationary satellites. Ion thrusters make it possible to obtain a specific impulse ($I_{sp}$) that is very high, being of the order of 1500 seconds (s) for Hall effect plasma thrusters, thus making it possible to obtain accurate control over the attitude and/or the position of the vehicle while involving mass and complexity that are considerably less than would need to be used in a conventional system having inertial devices, such as for example reaction wheels, in combination with chemical thrusters for desaturating the reaction wheels.

Preferably, in order to feed propellant gas to ion thrusters, the gas is stored in pressurized tanks. Nevertheless, a drawback encountered in this field is that of regulating the very low flow rate of the propellant gas feeding the ion thruster from such a pressurized tank. This is particularly difficult given that the pressure within the pressurized tank decreases progressively as the tank is emptied, and that it can be advantageous to regulate this flow rate not to a level that is constant, but rather to a plurality of different levels or to a level that is variable, so as to adapt the performance of the ion thruster to a plurality of different situations. The use of variable flow rate restrictors or valves would have the drawback of increasing the mechanical complexity of the feed device, with that being particularly problematic in a space environment since that environment is particularly hostile for mechanical devices having moving parts.

OBJECT AND SUMMARY OF THE INVENTION

The present disclosure seeks to remedy those drawbacks, in particular by proposing a method of feeding an ion thruster with propellant gas coming from a pressurized tank via a feed circuit comprising an on/off valve and, in succession downstream from said on/off valve, a high pressure restrictor, a buffer tank, and at least one low pressure restrictor, and that makes it possible to regulate the flow rate of propellant gas accurately by controlling the on/off valve.

The term "on/off valve" is used in the present context to designate a valve that can be controlled to occupy only two positions, open or closed. It is therefore normally not possible to control an intermediate level of opening for the purpose of regulating the flow rate directly. Nevertheless, an on/off valve presents the important advantage of being very simple, even in very hostile environments such as those encountered in space applications.

In at least one implementation, the object of regulating the flow rate of propellant gas through the on/off valve is achieved by the fact that said method comprises the steps of:
  calculating a pressure setpoint for the buffer tank as a function of a flow rate setpoint;
  calculating the difference between the pressure setpoint for the buffer tank and a pressure measured in the buffer tank;
  calculating a setpoint for the opening time of the on/off valve as a function of said difference and of a pressure inside said pressurized tank; and
  opening the on/off valve in compliance with said opening time setpoint.

Thus, by modulating the open times of the on/off valve as a function of the way pressure varies upstream and downstream from the on/off valve, it is possible to regulate the flow rate of the propellant gas in a manner that is indirect, but accurate.

In particular, the opening time setpoint is calculated on the basis of an inverse fluid flow model for said feed circuit. A fluid flow model of the feed circuit may represent the arrangement of flow restrictors and of fluid capacities in the feed circuit, including the capacities of the ducts in the circuit. The model thus provides a basis on which to calculate the way pressure varies downstream from the on/off valve as a function of the opening time of the valve and as a function of the upstream pressure. By inverting it, it is thus possible to calculate the opening time needed to reach a pressure setpoint downstream from the valve.

Simultaneously, the pressure setpoint for the buffer tank may be calculated on the basis of an inverse fluid flow model of the at least one low pressure restrictor downstream from the buffer tank. Specifically, since a fluid flow model of the at least one restrictor makes it possible to calculate the flow rate as a function of the pressure upstream, inverting it makes it possible to calculate the pressure setpoint on the basis of the flow rate setpoint.

Said propellant gas feed circuit may in particular include a bifurcation downstream from the low pressure restrictor, having a first branch for feeding an anode section of the ion thruster and a second branch for feeding a cathode section of the ion thruster, each of said first and second branches having a respective additional restrictor. Under such circumstances, in order to calculate the pressure setpoint for the buffer tank as a function of the flow rate setpoint, and in order to facilitate calculation, it is possible to use a simplified fluid flow model in which the assembly comprising the low pressure restrictor, the bifurcation downstream therefrom, and the two additional restrictors is represented by a single restrictor.

In order to ensure that this feed method is effective, the triggering of the opening of the on/off valve may be restricted by one or more criteria. For example, a first criterion may be that opening of the on/off valve in compliance with the opening time setpoint can be triggered only if the pressure setpoint for the buffer tank is substantially greater than the pressure measured in the buffer tank. By "substantially greater than" it should be understood that the pressure setpoint is greater than the measured pressure by a margin that is considerable, such as for example 5% or 10%. This criterion makes it possible to avoid untimely triggering of opening of the valve as a result of small fluctuations in pressure, and also to restrict the number of times the valve is opened and closed so as to prolong its lifetime. A second criterion, which may also be used in combination with the first criterion or in isolation is that the opening of the on/off valve in compliance with the opening time setpoint can be triggered only if the pressure measured in the buffer tank is decreasing or zero. This serves to avoid untimely triggering, in particular when it is determined that the buffer tank should be fed and the high pressure segment should feed into that volume, or when it is determined that the on/off valve should be opened while the circuit is blocked downstream. Finally, a third criterion, which can likewise be used in combination with the first and/or the second criterion or in isolation, is that the opening of the on/off valve in compliance with the opening time setpoint cannot be triggered unless the opening time setpoint is greater than a predetermined minimum threshold. This serves to avoid the on/off valve being controlled in a manner that is incompatible with its response time and this also serves to restrict the number of times the valve is opened and closed, in order to prolong its lifetime.

For the step of calculating an opening time setpoint for the on/off valve as a function of said difference and of a pressure inside said pressurized tank, the pressure in the tank can be measured directly. Nevertheless, in order to limit the number of sensors and thus simplify the feed device, it is possible as an alternative to measure this pressure indirectly on the basis of an initial pressure and of a total flow of propellant gas that has passed through the feed circuit. By integrating the total quantity of propellant gas that has been expelled from the pressurized tank through the feed circuit, it is possible to calculate how the pressure of the propulsion gas remaining in the pressurized tank will vary.

The propellant gas feed circuit may also include a safety valve upstream from the on/off valve in order to isolate it and the remainder of the circuit downstream therefrom, in the event of a technical failure.

The present disclosure also relates to a device for feeding a propellant gas to an ion thruster, which device is suitable for implementing such a feed method. For this purpose, in at least one embodiment, the feed device may comprise a pressurized tank for the propellant gas, and a feed circuit connected to the pressurized tank and comprising at least an on/off valve, a high pressure restrictor, a buffer tank, and a low pressure restrictor connected in succession downstream from the pressurized tank, together with a control unit for controlling the on/off valve and configured to calculate a pressure setpoint for the buffer tank as a function of a flow rate setpoint, to calculate the difference between the pressure setpoint for the buffer tank and a pressure measured in the buffer tank, to calculate a setpoint for the opening time of the on/off valve as a function of said difference and of a pressure inside said pressurized tank, and to command opening of the on/off valve in compliance with said opening time setpoint.

BRIEF DESCRIPTION OF THE DRAWINGS

The invention can be well understood and its advantages appear better on reading the following detailed description of embodiments and implementations given as non-limiting examples. The description refers to the accompanying drawings, in which.

DETAILED DESCRIPTION OF THE INVENTION

Figure 1:
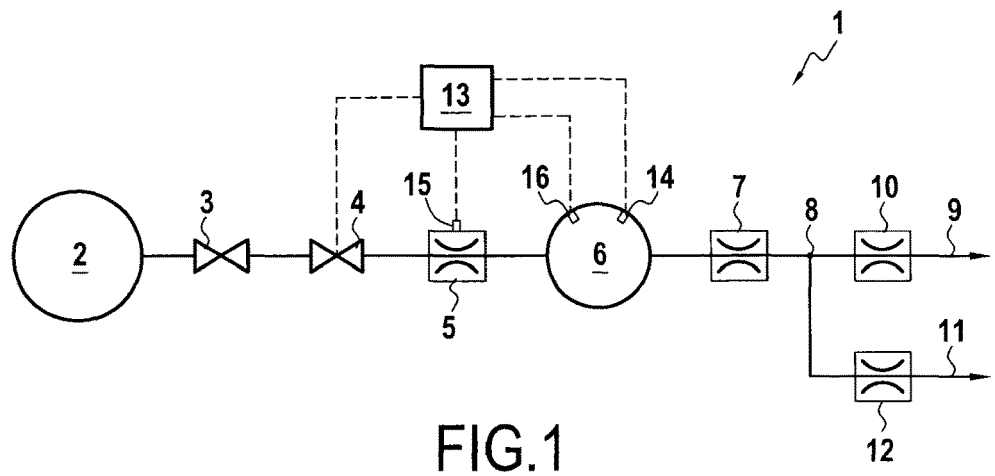
FIG. 1 is a diagrammatic view of a feed device in a first embodiment.

FIG. 1 shows a feed device 1 for feeding a plasma engine (not shown) with propellant gas, in a first embodiment and comprising a pressurized tank 2 connected to a feed circuit that has a safety valve 3; an on/off valve 4 for regulating the flow rate; a high pressure flow restrictor 5; a buffer tank 6; a low pressure flow restrictor 7; a bifurcation 8 having a first branch 9 for feeding an anode sector of the plasma engine and having its own restrictor 10, and a second branch 11 for feeding a cathode sector of the plasma engine, likewise having its own restrictor 12; and a control unit 13 connected to a pressure sensor 14 in the buffer tank 6.

The pressurized tank 2 is adapted to contain a propellant gas, such as xenon, for example, at high pressure, so as to be capable of feeding the plasma engine throughout the anticipated lifetime of the space vehicle that includes the plasma engine and its feed device 1. The safety valve 3 is interposed between the pressurized tank 2 and the remainder of the feed circuit so as to isolate the pressurized tank 2, e.g. while the space vehicle is being launched, or in the event of a failure. Throughout normal operation of the feed device 1, this safety valve 3 nevertheless remains open.

The on/off valve 4 connected directly downstream from the safety valve 3 in the feed circuit is connected to the control unit 13 in order to regulate the flow rate of the propellant gas coming from the pressurized tank 2 and supplied to the plasma engine via the feed circuit using the feed method that is described below. Downstream from this on/off valve 4 in the feed circuit, the high pressure restrictor 5 restrains the flow of propellant gas from the on/off valve 4 to the buffer tank 6. Thereafter, downstream from the buffer tank 6, the low pressure restrictor 7 restrains the flow of the propellant gas towards the bifurcation 8 and its first and second branches 9 and 11. Finally, in each of these branches 9 and 11, the corresponding restrictor 10 or 12 restrains the flow of propellant gas towards the various sections of the plasma engine.

Figure 2:
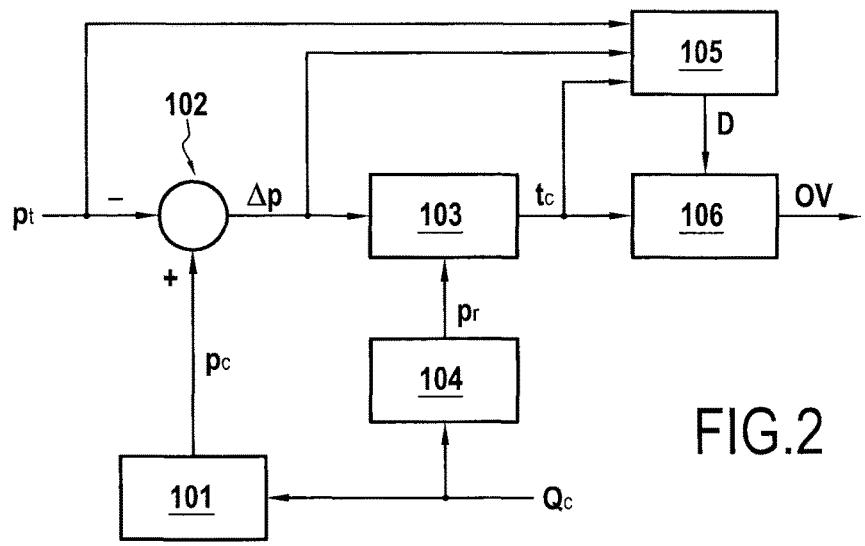
FIG. 2 is a diagram of the feed method for use with the same embodiment.

In operation, the control unit 13 controls the on/off valve 4 so as to perform the feed method shown in FIG. 2. In a first step 101 of the method, and as a function of a flow rate setpoint $Q_c$, possibly being a mass flow rate setpoint coming from an attitude and/or trajectory control system of the space vehicle, the control unit 13 calculates a setpoint $p_c$ for pressure in the buffer tank 6 on the basis of an inverse model of the portion of the feed circuit situated downstream from the buffer tank 6. This model may be simplified, so as to consider all of the restrictors 7, 10, and 12, and also the fluid capacity of the ducts interconnecting them merely as a single restrictor.

Thus, by way of example, the setpoint $p_c$ may be calculated using the following formula:

$$p_c = Q_c \frac{PdC_{aval}}{k_g \cdot f(T)}$$

where $PdC_{aval}$ represents the equivalent head loss of the feed circuit downstream from the buffer tank 6 measured in liquid ohms (Lohms), $k_g$ is a coefficient of the propellant gas, and $f(T)$ is a correction factor that is a function of the temperature T of the propellant gas.

This pressure setpoint $p_c$ thus represents the pressure that ought to exist inside the buffer tank 6 in order to ensure that propellant gas flows at a rate in compliance with the flow rate $Q_c$ from the buffer tank to the plasma engine via the portion of the feed circuit that is situated downstream from the buffer tank 6.

Figure 3A:
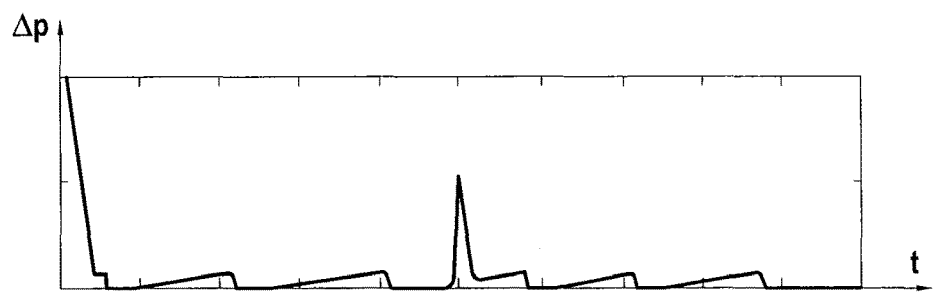
FIGS. 3A to 3D are graphs showing variation over time respectively in a pressure difference setpoint, an opening time setpoint for the on/off valve, a signal for opening the on/off valve, and a pressure inside the buffer tank.

In the following step 102, this pressure setpoint $p_c$ is compared with a real pressure $p_t$ inside the buffer tank 6 in order to calculate a difference $\Delta p$ between the pressure setpoint $p_c$ and the real pressure $p_t$. FIG. 3A shows an example of how this difference $\Delta p$ may vary over time. Thereafter, in step 103, a setpoint $t_c$ for the opening time of the on/off valve 4 is calculated as a function of the difference $\Delta p$ of a pressure $p_r$ in the pressurized tank 2, on the basis of an inverse fluid flow model for the entire feed circuit, including the fluid capacities in the ducts situated between the two valves 3, 4, between the on/off valve 4 and the high pressure restrictor 5, and in the ducts connecting together the restrictors 7, 10, and 12.

By way of example, two different formulae may be used for calculating this setpoint $t_c$ for the opening time of the on/off valve 4, depending on the ratio between the pressure setpoint $p_c$ and the pressure $p_r$ in the pressurized tank 2.

Thus, if the difference $\Delta p$ is less than the pressure $p_r$ in the pressurized tank 2 multiplied by the dead volume $V_{4-5}$ between the on/off valve 4 and the high pressure restrictor 5, and divided by the volume $V_6$ of the buffer tank 6, the setpoint $t_c$ for the opening time of the on/off valve 4 may be calculated using the following formula:

$$t_c = \frac{\Delta p \cdot R \cdot T \cdot V_6}{k_{Lee} \cdot p_r \cdot f(T) \cdot M_{mol} \cdot c_g^2} \cdot PdC_4$$

where $c_g$ represents the speed of sound in the propellant gas, $k_{Lee}$ is a coefficient specific to the on/off valve 4 and/or to the high pressure restrictor 5, $M_{mol}$ is the molar pressure of the propellant gas, $PdC_4$ is the head loss through the on/off valve 4, and R is the specific gas constant of the propellant gas (which may optionally be approximated by the universal gas constant of a perfect gas).

In contrast, if the difference $\Delta p$ is equal to or greater than the pressure $p_r$ in the pressurized tank 2, multiplied by the dead volume $V_{4-5}$ between the on/off valve 4 and the high pressure restrictor 5 and divided by the volume $V_6$ of the buffer tank 6, then the setpoint $t_c$ for the opening time of the on/off valve 4 may be calculated using the following formula:

$$t_c = \frac{\Delta p \cdot R \cdot T \cdot V_6}{k_{Lee} \cdot p_r \cdot f(T) \cdot M_{mol} \cdot c_g^2} \cdot (PdC_4 + PdC_5)$$

where $PdC_5$ represents the head loss of the high pressure restrictor 5.

Figure 3B:
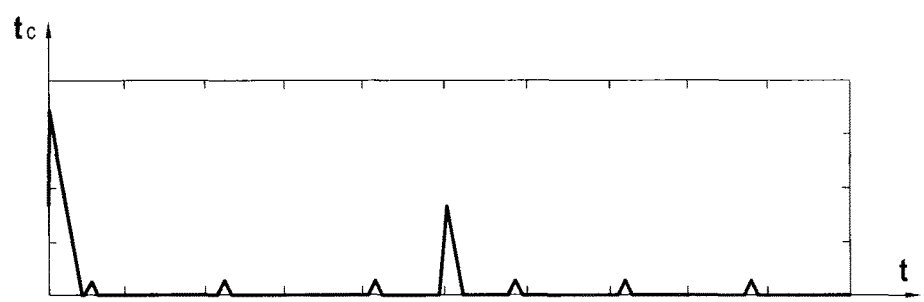

In the implementation shown, the pressure $p_r$ in the pressurized tank 2 is estimated indirectly in a step 104 by integrating the flow rate setpoint $Q_c$ over the past in order to estimate the quantity of propellant gas that has already been extracted from the pressurized tank 2, and by calculating the difference between the known initial pressure $p_i$ and the current pressure $p_r$ of the pressurized tank 2. FIG. 3B shows an example of how the opening time setpoint $t_c$ varies over time, and it matches the way the difference $\Delta p$ varies as shown in FIG. 3A.

Nevertheless, in order to trigger opening of the on/off valve 4, three conditions need to be satisfied in a step 105:

Firstly, the pressure difference $\Delta p$ between the pressure setpoint $p_c$ and the real pressure $p_t$ must be substantially positive, i.e. the pressure setpoint $p_c$ must be greater than the real pressure $p_t$ by a detectable margin, e.g. 5% or 10%.

Furthermore, the pressure $p_t$ in the buffer tank 6 must be decreasing or zero.

Finally, the setpoint $t_c$ for the opening time of the on/off valve 4 must be greater than some minimum threshold $t_{c,min}$.

Figure 3C:
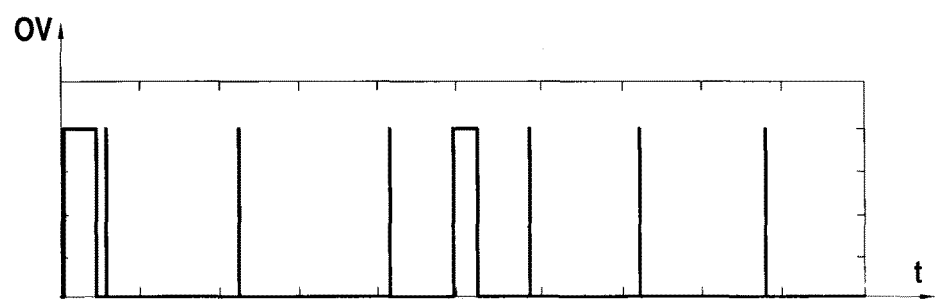
Figure 3D:
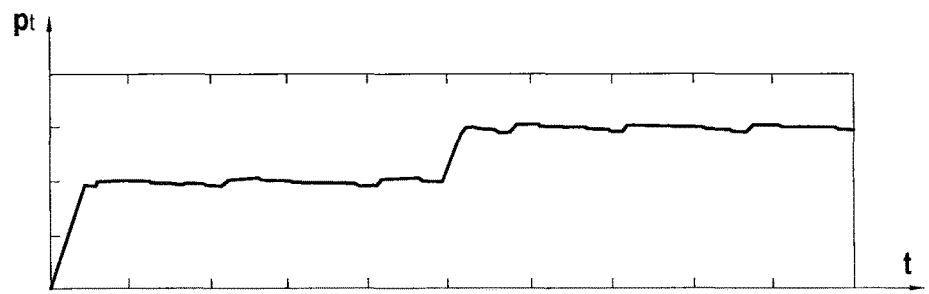

Only if all three of these conditions are satisfied, does the control unit 13 trigger a trigger signal D, during a step 106 for sending an opening command OV to the on/off valve 4 for a length of time corresponding to the opening time setpoint $t_c$ as monitored by a timer incorporated in the control unit 13. FIG. 3C shows how this command is issued in response to the variation in the opening time setpoint $t_c$ as a function of time and as shown in FIG. 3B. Because of the temporary opening of the on/off valve 4 as a result of the command OV as shown in FIG. 3C, the pressure $p_t$ in the buffer tank 6 rises, as shown in FIG. 3D, thereby increasing the flow rate of the propellant gas flowing from the buffer tank 6 to the plasma engine.

Figure 4:
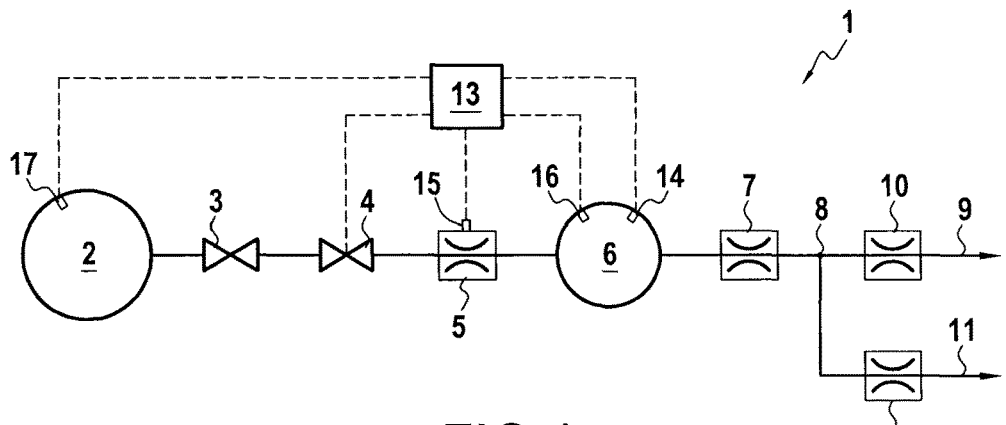
FIG. 4 is a diagrammatic view of the feed device in a second embodiment.

FIG. 4 shows a feed device 1 in an alternative embodiment and including at least one pressure sensor 17 in the pressurized tank 2, which sensor is connected to the control unit 13. All of the other elements of this second embodiment are equivalent to corresponding elements in the first embodiment and they are given the same reference numbers. The operation of the feed device 1 also corresponds to the method shown in FIG. 2, except that in step 104, the pressure $p_r$ in the pressurized tank 2 can be measured directly by the at least one pressure sensor 17, instead of being estimated indirectly.

Although the present invention is described above with reference to specific embodiments, it is clear that various modifications and changes may be made to these embodiments without going beyond the general ambit of the invention as defined by the claims. Consequently, the description and the drawings should be considered in a sense that is illustrative rather than restrictive.

The invention claimed is:

1. A method of feeding an ion thruster with propellant gas coming from a pressurized tank via a feed circuit comprising an on/off valve and, in succession downstream from said on/off valve, a high pressure restrictor, a buffer tank, and at least one low pressure restrictor, the method comprising:
    calculating a pressure setpoint for the buffer tank as a first function of a flow rate setpoint;

calculating a difference between the pressure setpoint for the buffer tank and a buffer tank pressure measured in the buffer tank;

calculating an opening time setpoint for the on/off valve as a second function of said difference and of a pressurized tank pressure inside said pressurized tank; and opening the on/off valve in compliance with said opening time setpoint, wherein the on/off valve is a single on/off valve controlled to occupy only either an open position or a closed position and not to occupy positions between the open position and the closed position, in order to regulate, according to the flow rate setpoint, a flow rate of the propellant gas from the buffer tank to the ion thruster, and the opening of the on/off valve in compliance with the opening time setpoint is triggered only when the pressure setpoint for the buffer tank is at least 5% greater than the buffer tank pressure measured in the buffer tank.

2. The method according to claim 1, wherein said opening time setpoint is calculated on the basis of an inverse fluid flow model for said feed circuit.

3. The method according to claim 1, wherein the pressure setpoint for the buffer tank is calculated on the basis of an inverse fluid flow model of the at least one low pressure restrictor downstream from the buffer tank.

4. The method according to claim 1, wherein the opening of the on/off valve in compliance with the opening time setpoint is triggered only if the buffer tank pressure measured in the buffer tank is decreasing or zero.

5. The method according to claim 1, wherein the opening of the on/off valve in compliance with the opening time setpoint is triggered only if the buffer tank is decreasing or zero.

6. The method according to claim 1, wherein said feed circuit includes a bifurcation downstream from the at least one low pressure restrictor, having a first branch for feeding an anode section of the ion thruster and a second branch for feeding a cathode section of the ion thruster, each of said first and second branches having a respective additional restrictor.

7. The method according to claim 1, wherein the pressurized tank pressure inside said pressurized tank is measured indirectly on the basis of an initial pressure and of an overall flow of propellant gas that has passed through the feed circuit.

8. The method according to claim 1, wherein said feed circuit includes a safety valve upstream from the on/off valve.

9. The method according to claim 1, wherein the pressure setpoint for the buffer tank is calculated as $Q_c$, where $Q_c$, is the flow rate setpoint, $PdC_{avai}$ is an equivalent head loss of the feed circuit downstream from the buffer tank measured in liquid ohms (Lohms), $k_g$ is a coefficient of the propellant gas, and f(T) is a correction factor that is a function of a temperature T of the propellant gas.

* * * * *